No. 617,880. Patented Jan. 17, 1899.
W. A. KUSTER.
COOKING UTENSIL.
(Application filed Mar. 10, 1898.)

(No Model.)

WITNESS
Q. McComb.
Emily Seidler.

INVENTOR
W. A. Kuster.
BY
Clark Deamer & Co.
ATTORNEYS.

UNITED STATES PATENT OFFICE.

WILLIAM A. KUSTER, OF NEW YORK, N. Y., ASSIGNOR OF ONE-HALF TO ANNIE SILVER, OF SAME PLACE.

COOKING UTENSIL.

SPECIFICATION forming part of Letters Patent No. 617,880, dated January 17, 1899.

Application filed March 10, 1898. Serial No. 673,373. (No model.)

*To all whom it may concern:*

Be it known that I, WILLIAM A. KUSTER, a citizen of the United States, and a resident of New York, (Brooklyn,) county of Kings, and State of New York, have invented certain new and useful Improvements in Cooking Utensils, of which the following is a specification, reference being had to the accompanying drawings, forming a part thereof, in which similar letters of reference indicate corresponding parts.

This invention relates to an improvement in cooking utensils; and the object is to provide a simple, inexpensive, and durable device to prevent the burning of vegetables or other articles of food to be cooked therein, owing to their contact with the bottom of the utensil, and to facilitate the operation of steaming articles of food.

The invention consists, primarily, in the employment of a detachable lid or cover, a part of which is perforated to form a strainer and which has a secondary cover thereover, and means for holding said lid firmly upon the top of the utensil when tilting to drain the food within.

Another feature may be found in the false bottom, which is perforated and serves to keep the vegetables or other food contained in the utensil from contact with the bottom, at the same time permitting the free passage of steam therethrough.

The invention will be hereinafter fully described, and specifically set forth in the annexed claims.

Figure 1:
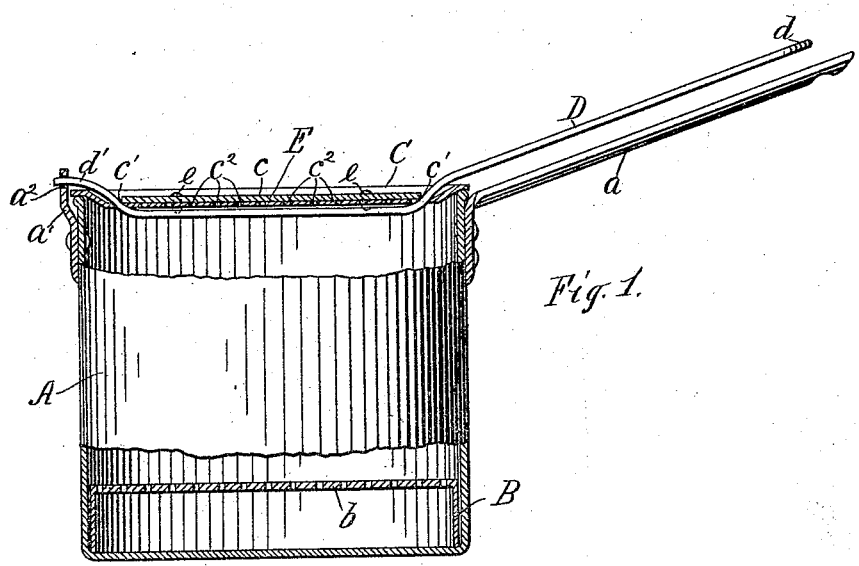
Figure 2:
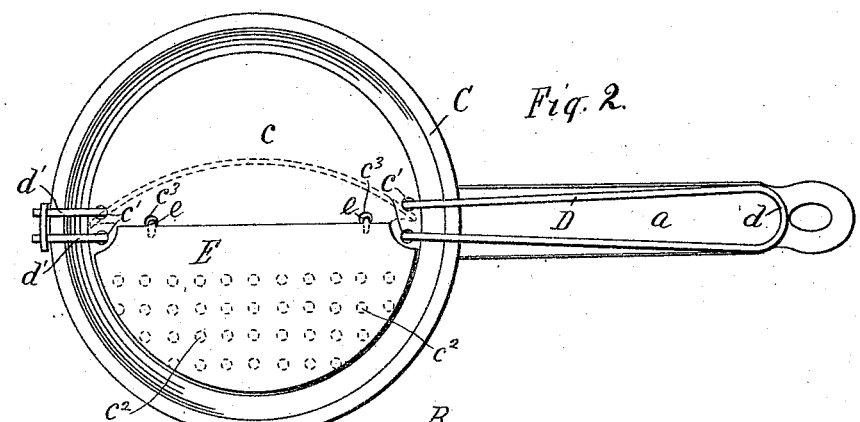
Figure 3:
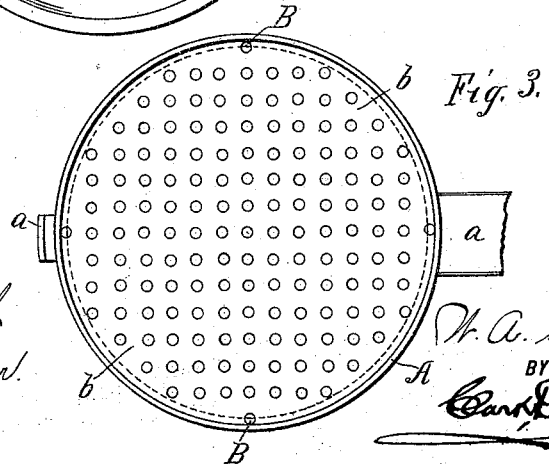

In the accompanying drawings, Figure 1 is a side elevation of the device, partly sectional. Fig. 2 is a plan view. Fig. 3 is a plan view of the device with the cover removed and the handle broken off.

In applying my invention I employ the utensil A, of the ordinary type, having a handle $a$ fixed thereon. Opposite the handle an upwardly-projecting lug $a'$ is riveted or otherwise fastened to the side wall of the utensil A and is provided with a horizontal slot $a^2$ near the upper edge thereof.

A ring B, of slightly less diameter than the inside diameter of the utensil, has fixed upon the upper edge thereof a perforated plate $b$, upon which the articles to be cooked are placed, the lower edge of said ring B resting upon the bottom of the utensil.

A lid C, preferably of metal, is adapted to rest upon the upper edge of the utensil, and the central portion thereof is preferably depressed somewhat, as at $c$. Holes $c'$ through said depressed portion are adapted to receive the wire handle D, which is formed of a single piece of wire bent in a loop $d$, adapted to be grasped by the hand while tilting the utensil. From the loop the two arms are passed through the holes $c'$ and across the under face of the lid and up through the opposite holes $c'$, thence curved outwardly over the lid, as at $d'$. The ends $d'$ are adapted to pass through the slot $a^2$.

It will readily be seen that when the lid is in position upon the utensil, the wire ends $d'$ $d'$ being entered in the slots $a^2$ and the handle D grasped at the same time, the utensil is raised by the handle $a$, that the lid will be held firmly in place.

To permit the water to be drained from the utensil without spilling the solid contents thereof, a series of perforations $c^2$ are formed in a portion of the depressed part of the lid C. A flap or cover E, preferably of metal, normally rests over the perforated portion of the lid and prevents the steam from passing upward through said perforations.

Hooks $e$, formed upon one side of the flap or cover E, are adapted for engagement with holes $c^3$ in the depressed portion of the lid. Should it be desired to allow the steam to escape from the utensil while in operation, the flap or cover E may be thrown back to the position shown by dotted lines in Fig. 2. The perforations $c^2$ $c^2$ will then be opened and the steam can readily escape therethrough.

The handle D may be formed of a strip of metal and riveted to the lid C, if desired, and the ends $d'$ $d'$ may be dispensed with and a flat metallic spur riveted to the lid substituted therefor. Any form of hinge may be employed in connecting the flap E with the lid C, but the construction shown is at this time preferred.

Having thus described my invention, what I claim as new, and desire to secure by Letters Patent, is—

1. An improved cooking utensil, embodying a saucepan having a handle fixed thereto, an upwardly-projecting lug fixed thereto and positioned diametrically opposite from said handle, a lid adapted to normally close the mouth of said saucepan, said lid being provided with a handle and a projecting spur adapted for engagement with said lug, substantially as shown and described.

2. An improved cooking utensil, embodying a saucepan provided with a handle and an upwardly-projecting lug, a lid adapted to normally close the mouth of said saucepan, said lid being provided with a spur adapted for engagement with said lug and with a handle, and means for controlling the escape of steam and water from said utensil, substantially as shown and described.

3. A cooking utensil, embodying a saucepan provided with a handle and an upwardly-projecting lug, a lid adapted to close the mouth of said saucepan, said lid being provided with a handle fixed thereto and with a spur adapted for engagement with said lug, a portion of said lid being perforated to serve as a strainer, a flap or cover hinged to said lid and adapted to normally close said perforated portion, substantially as shown and described.

In testimony that I claim the foregoing as my invention I have signed my name, in presence of two witnesses, this 9th day of March, 1898.

WILLIAM A. KUSTER.

Witnesses:
B. McCOMB,
EMILY SEIDLER.